(12) United States Patent
Mori et al.

(10) Patent No.: US 11,531,344 B2
(45) Date of Patent: Dec. 20, 2022

(54) AUTONOMOUS RUNNING DEVICE, RUNNING CONTROL METHOD FOR AUTONOMOUS RUNNING DEVICE, AND RUNNING CONTROL PROGRAM OF AUTONOMOUS RUNNING DEVICE

(71) Applicant: NSK Ltd., Tokyo (JP)

(72) Inventors: Mayuko Mori, Kanagawa (JP); Kei Kondo, Kanagawa (JP); Masaaki Tanoue, Kanagawa (JP); Satoshi Ozaki, Kanagawa (JP)

(73) Assignee: NSK LTD., Tokyo (JP)

( * ) Notice: Subject to any disclaimer, the term of this patent is extended or adjusted under 35 U.S.C. 154(b) by 227 days.

(21) Appl. No.: 16/634,709

(22) PCT Filed: Apr. 26, 2019

(86) PCT No.: PCT/JP2019/017876
§ 371 (c)(1),
(2) Date: Jan. 28, 2020

(87) PCT Pub. No.: WO2020/039656
PCT Pub. Date: Feb. 27, 2020

(65) Prior Publication Data
US 2021/0255628 A1    Aug. 19, 2021

(30) Foreign Application Priority Data

Aug. 23, 2018 (JP) .............................. JP2018-156681

(51) Int. Cl.
G05D 1/02 (2020.01)
(52) U.S. Cl.
CPC ......... *G05D 1/0212* (2013.01); *G05D 1/0276* (2013.01)

(58) Field of Classification Search
CPC .. G05D 1/0212; G05D 1/0276; G05D 1/0251; G05D 1/027; G05D 1/0272;
(Continued)

(56) References Cited

U.S. PATENT DOCUMENTS

2009/0312871 A1    12/2009  Lee et al.
2011/0254978 A1*   10/2011  Yamaji ............... H04N 5/23206
                                                     348/231.3
(Continued)

FOREIGN PATENT DOCUMENTS

JP    63-225809 A    9/1988
JP    01-207804 A    8/1989
(Continued)

OTHER PUBLICATIONS

Miyazaki Ichiro, WO2019026761 Moving Body and Computer Program, 2019 (Year: 2019).*

(Continued)

*Primary Examiner* — Babar Sarwar
(74) *Attorney, Agent, or Firm* — Sughrue Mion, PLLC

(57) ABSTRACT

Provided are an autonomous running device, a running control method for the autonomous running device, and a running control program of the autonomous running device that allow the autonomous running device to reach a destination while continuing estimation of its self-position. An autonomous running device includes a first position estimation unit that estimates the position of the autonomous running device on the basis of information about surroundings of the autonomous running device, produces information about the estimated position of the autonomous running device as first positional information, and updates the first positional information, a second position estimation unit that estimates the position of the autonomous running device on the basis of rotation amounts of wheels, produces informa-
(Continued)

tion about the estimated position of the autonomous running device as second positional information, and updates the second positional information, and a control unit.

8 Claims, 10 Drawing Sheets

(58) Field of Classification Search
CPC ......... G05D 2201/0206; G05D 1/0274; G01C 21/005; G01C 21/206
See application file for complete search history.

(56) References Cited

U.S. PATENT DOCUMENTS

| | | | | |
|---|---|---|---|---|
| 2014/0297066 | A1* | 10/2014 | Sakai | G05D 1/0038 701/2 |
| 2016/0152241 | A1* | 6/2016 | Denda | G05D 1/0088 701/23 |
| 2016/0377437 | A1* | 12/2016 | Brannstrom | G01C 21/165 701/501 |
| 2017/0102709 | A1* | 4/2017 | Kwak | A47L 9/009 |
| 2017/0168498 | A1* | 6/2017 | Nakajima | G05D 1/0088 |
| 2017/0299397 | A1* | 10/2017 | Ichikawa | G01C 21/34 |
| 2017/0307398 | A1* | 10/2017 | Iwaasa | G01C 21/32 |
| 2019/0004520 | A1* | 1/2019 | Maeno | G05D 1/0274 |
| 2019/0265040 | A1* | 8/2019 | Takano | G01S 5/16 |
| 2019/0294181 | A1* | 9/2019 | Ohno | G05D 1/0238 |
| 2020/0231176 | A1* | 7/2020 | Motoyama | B60W 60/001 |
| 2020/0333789 | A1* | 10/2020 | Suzuki | G01S 17/89 |
| 2021/0064036 | A1* | 3/2021 | Muro | G05D 1/0272 |

FOREIGN PATENT DOCUMENTS

| | | | | |
|---|---|---|---|---|
| JP | 2005-148960 | A | | 6/2005 |
| JP | 2012-068736 | A | | 4/2012 |
| JP | 2012068736 | A | * | 4/2012 |
| JP | 2012-128781 | A | | 7/2012 |
| JP | 2014-174070 | A | | 9/2014 |
| JP | 2015-121928 | A | | 7/2015 |
| JP | 2019-046159 | A | | 3/2019 |
| WO | 2018/137047 | A1 | | 8/2018 |
| WO | 2019/026761 | A1 | | 2/2019 |
| WO | WO-2019026761 | A1 | * | 2/2019 ............... G05D 1/02 |

OTHER PUBLICATIONS

Matsukuma Kenji, JP2012068736—Mobile Body, 2012 (Year: 2012).*
Yusuke Hieida et al., "Development of Robust Autonomous Mobile Robot with Layered Localization System," Sep. 15, 2009, 4 pages.
International Search Report of PCT/JP2019/017876 dated Jul. 2, 2019.
Extended European Search Report dated Apr. 13, 2022, issued in European Application No. 19851031.5.

* cited by examiner

AUTONOMOUS RUNNING DEVICE, RUNNING CONTROL METHOD FOR AUTONOMOUS RUNNING DEVICE, AND RUNNING CONTROL PROGRAM OF AUTONOMOUS RUNNING DEVICE

CROSS REFERENCE TO RELATED APPLICATIONS

This application is a National Stage of International Application No. PCT/JP2019/017876 filed Apr. 26, 2019, claiming priority based on Japanese Patent Application No. 2018-156681 filed Aug. 23, 2018.

FIELD

The present invention relates to an autonomous running device, a running control method for the autonomous running device, and a running control program of the autonomous running device.

BACKGROUND

Autonomous mobile apparatuses such as autonomous mobile robots that autonomously move toward set destinations are known. Autonomous running devices provided to the autonomous mobile apparatuses such as autonomous mobile robots have map information about fields preliminarily input therein and produce routes to destinations by connecting nodes set on maps. For example, a control method is disclosed in which a recognition marker is preliminarily provided for image recognition of a destination, a taught route is followed to move in a range where the image recognition of the recognition marker is failed, and once the image recognition of the recognition marker is achieved, autonomous moving is performed toward the recognition marker (e.g., Patent Literature 1).

For another example, a guidance device is disclosed that acquires a feature point from an image obtained by a radar and estimates its self-position using positional information about a landmark corresponding to the feature point on a map and information about a distance to the feature point obtained from the image (e.g., Patent Literature 2).

CITATION LIST

Patent Literature

Patent Literature 1: Japanese Patent Application Laid-open No. 2015-121928 A
Patent Literature 2: Japanese Patent Application Laid-open No. 2014-174070 A

SUMMARY

Technical Problem

When an operation range of the autonomous mobile apparatus is assumed to be indoor facilities of a hospital, for example, or an outdoor environment, a peculiar marker such as a recognition marker may not be provided on a route to a destination in some cases. Estimation accuracy of the self-position may be reduced depending on an environment on the route of the autonomous mobile apparatus (e.g., when a visible light camera is used as an image sensor, an environment where luminance of an image is excessively high or low, or an environment where a luminance difference is large) in some cases.

In view of the problems described above, the invention is made and aims to provide an autonomous running device, a running control method for the autonomous running device, and a running control program of the autonomous running device that allow the autonomous running device to reach a destination while continuing estimation of its self-position.

Solution to Problem

To achieve the above object, an autonomous running device according to one embodiment of the present invention that autonomously runs in a certain area is disclosed. The autonomous running device includes a surrounding information acquisition unit that acquires information about surroundings of the autonomous running device, a running unit that moves the autonomous running device, a rotation sensor that detects rotation amounts of wheels provided to the running unit, a first position estimation unit that estimates a position of the autonomous running device on the basis of the information about the surroundings of the autonomous running device, produces information about the estimated position of the autonomous running device as first positional information, and updates the first positional information, a second position estimation unit that estimates a position of the autonomous running device on the basis of the rotation amounts, produces information about the estimated position of the autonomous running device as second positional information, and updates the second positional information, and a control unit that performs autonomous movement control on the autonomous running device on the basis of the first positional information or the second positional information, a storage unit. The first position estimation unit successively updates the first positional information and stores the updated first positional information in the storage unit, the second position estimation unit estimates the position of the autonomous running device using, as an initial position, the position stored in the storage unit as the first positional information, when the first positional information is an abnormal value, and the control unit performs the autonomous movement control on the basis of the second positional information when the first positional information is an abnormal value.

The autonomous running device structured described above can continue the autonomous movement control on the basis of the second positional information updated by the second position estimation unit even when the first positional information estimated by the first position estimation unit is an abnormal value, thereby making it possible to reach the target point.

The autonomous running device structured described above can continue the autonomous movement control on the basis of the first positional information updated by the first position estimation unit even when the second positional information estimated by the second position estimation unit is an abnormal value, thereby making it possible to reach the target point.

As a desirable embodiment, it is preferable that the autonomous running device further includes a surrounding information analysis unit that analyzes the information about the surroundings of the autonomous running device as surrounding information data and outputs the surrounding information data to the first position estimation unit. A storage unit stores therein, as a positional information pattern, at least a feature of a surrounding environment for each of a plurality of positions in the area. The first position estimation unit collates the surrounding information data with the positional information pattern and estimates the position of the autonomous running device.

This makes it possible to estimate the position of the autonomous running device without providing a specific landmark in the area.

As a desirable embodiment of the autonomous running device, it is preferable that the surrounding information analysis unit sets a range including a certain elevation angle direction with respect to a movement direction of the autonomous running device as an acquisition range of the surrounding information data.

This makes it possible to prevent accuracy reduction of the surrounding information data caused by a moving body (e.g., human body) in the movement direction of the autonomous running device.

This makes it possible to reduce an error in the position of the autonomous running device estimated by the second position estimation unit.

As a desirable embodiment, it is preferable that the autonomous running device further includes a route generation unit that produces a route of the autonomous running device. The control unit produces a track of the autonomous running device along the route and performs real time computing processing such that the autonomous running device autonomously moves on the track.

This allows the autonomous running device to autonomously runs along the produced route.

As a desirable embodiment of the autonomous running device, it is preferable that the route generation unit produces the route from the position of the autonomous running device in the area to a target point.

This allows the autonomous running device to autonomously runs along the route from the position where the autonomous running device is disposed in the area to the target point.

As a desirable embodiment of the autonomous running device, wherein, it is preferable that when target point information serving as positional information about the target point is received from an external apparatus, the route generation unit uses the position of the autonomous running device estimated by the first position estimation unit as an initial position, and produces the route from the initial position to the target point.

This allows the autonomous running device to autonomously runs toward the target point specified by the external apparatus.

As a desirable embodiment of the autonomous running device, it is preferable that when the autonomous running device is deviated from the route, the route generation unit uses the position of the autonomous running device estimated by the first position estimation unit as a current position, and reproduces the route from the current position to the target point.

This allows the autonomous running device to reach the target point even when the autonomous running device is deviated from the originally set route.

To achieve the above object, a running control method according to one embodiment for an autonomous running device that autonomously runs in a certain area is disclosed. The running control method includes a step of producing a route from a position of the autonomous running device in the area to a target point, a step of estimating a position of the autonomous running device on the basis of information about surroundings of the autonomous running device, producing information about the estimated position of the autonomous running device as first positional information, and updating the first positional information, a step of successively updating the first positional information and storing the updated first positional information in a storage unit, a step of performing autonomous movement control on the autonomous running device on the basis of the first positional information when the first positional information is a normal value, a step of estimating a position of the autonomous running device using, as an initial position, the position stored in the storage unit as the first positional information, on the basis of rotation amounts of wheels provided to a running unit that moves the autonomous running device, when the first positional information is an abnormal value, producing information about the estimated position of the autonomous running device as second positional information, and updating the second positional information, and a step of performing the autonomous movement control on the basis of the second positional information when the first positional information is an abnormal value.

The running control method for the autonomous running device allows the autonomous running device to continue the autonomous movement control on the basis of the second positional information updated by the second position estimation unit even when the first positional information estimated by the first position estimation unit is an abnormal value, thereby allowing the autonomous running device to reach the target point.

To achieve the above object, a computer readable recording medium storing therein a running control program according to one embodiment of an autonomous running device that autonomously runs in a certain area is disclosed. The running control program causes a computer to execute processing for producing a route from a position of the autonomous running device in the area to a target point, estimating a position of the autonomous running device on the basis of information about surroundings of the autonomous running device, producing information about the estimated position of the autonomous running device as first positional information, and updating the first positional information, successively updating the first positional information and storing the updated first positional information in a storage unit, performing autonomous movement control on the autonomous running device on the basis of the first positional information when the first positional information is a normal value, estimating a position of the autonomous running device using, as an initial position, the position stored in the storage unit as the first positional information, on the basis of rotation amounts of wheels provided to a running unit that moves the autonomous running device, when the first positional information is an abnormal value, producing information about the estimated position of the autonomous running device as second positional information, and updating the second positional information, and performing the autonomous movement control on the basis of the second positional information when the first positional information is an abnormal value.

The running control program of the autonomous running device allows the autonomous running device to continue the autonomous movement control on the basis of the second positional information updated by the second position estimation unit even when the first positional information estimated by the first position estimation unit is an abnormal value, thereby allowing the autonomous running device to reach the target point.

Advantageous Effects of Invention

The invention can provide the autonomous running device, the running control method for the autonomous running device, and the running control program of the autonomous running device that allow the autonomous running device to reach the destination while continuing estimation of its self-position.

DESCRIPTION OF EMBODIMENTS

The following describes ways for implementation of the invention (hereinafter, described as the embodiments) in detail with reference to the accompanying drawings. The following embodiments do not limit the invention. The constituent elements described in the following embodiments include those easily envisaged by those skilled in the art and substantially identical ones what is called a range of equivalents. The constituent elements disclosed in the following embodiments can be combined as appropriate.

First Embodiment

Figure 1:
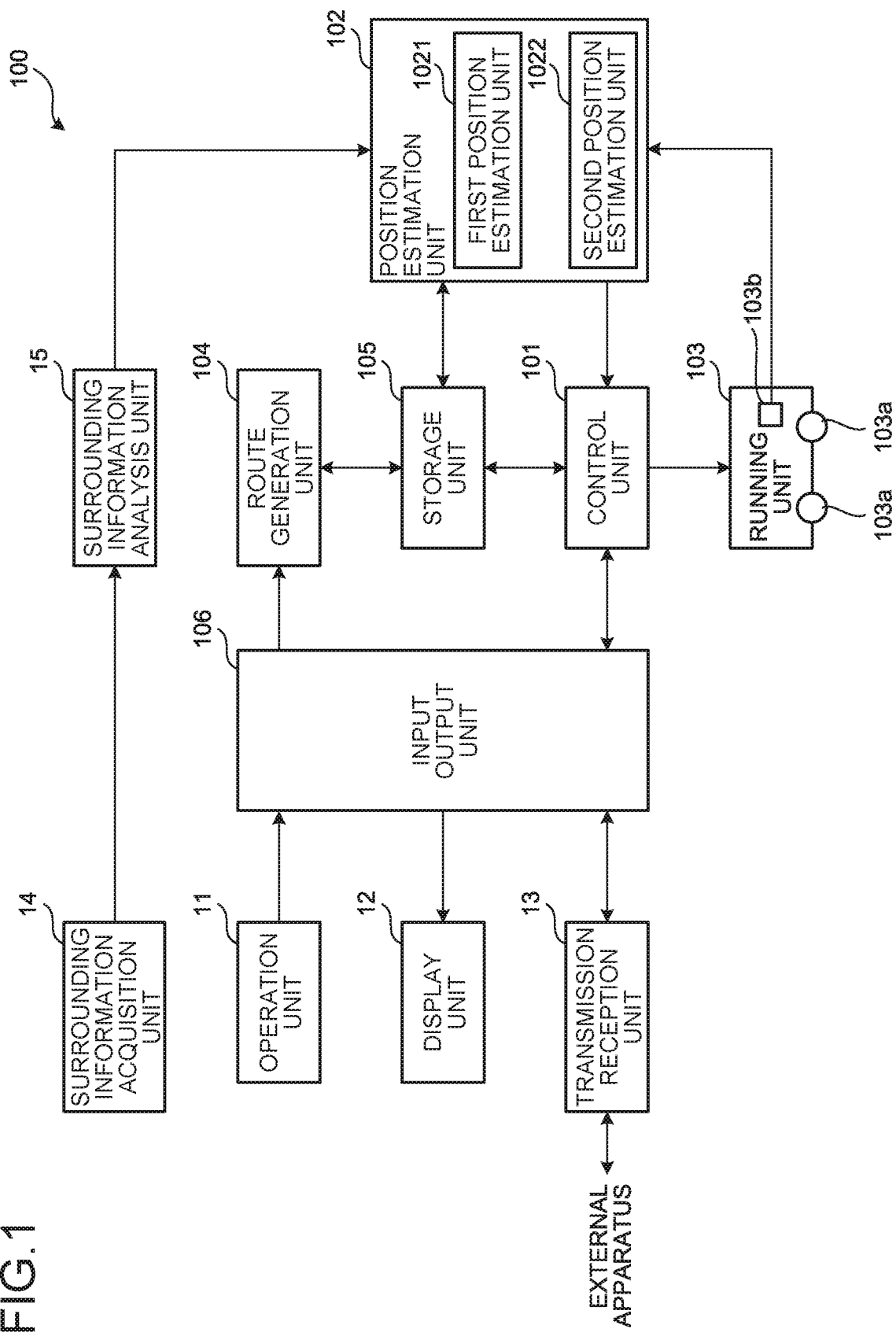
FIG. 1 is a diagram illustrating an example of an autonomous running device according to a first embodiment.

FIG. 1 is a diagram illustrating an example of an autonomous running device according to a first embodiment. Examples of an autonomous running device 100 include a guidance robot that guides a person to be guided to indoor facilities in a building of a public facility such as a hospital, and an autonomous mobile robot such as a conveyance robot that conveys goods specified by an operator such as a doctor from a warehouse, for example, to the operator, or conveys parts in production lines in a factory, for example.

The autonomous running device 100 according to the embodiment is a moving body that autonomously moves toward a target point. As illustrated in FIG. 1, the autonomous running device 100 includes an operation unit 11, a display unit 12, a transmission reception unit 13, a surrounding information acquisition unit 14, a surrounding information analysis unit 15, a control unit 101, a position estimation unit 102, a running unit 103, a route generation unit 104, a storage unit 105, and an input output unit 106.

In the embodiment, the operation unit 11, the display unit 12, the transmission reception unit 13, the surrounding information acquisition unit 14, the surrounding information analysis unit 15, the control unit 101, the position estimation unit 102, the route generation unit 104, the storage unit 105, and the input output unit 106 are functional blocks achieved by constituent elements of a computer executing a running control program according to the embodiment. The operation unit 11, the display unit 12, the transmission reception unit 13, the surrounding information acquisition unit 14, the surrounding information analysis unit 15, the control unit 101, the position estimation unit 102, the route generation unit 104, the storage unit 105, and the input output unit 106 may be individual circuits for achieving respective functions in running control processing, which is described later.

The operation unit 11 is a constituent unit to which an operator inputs information necessary to control the autonomous running device 100. An example of the operation unit 11 is a touch panel (not illustrated) to which the operator can input information by touching it.

The display unit 12 displays a result of operation performed on the operation unit 11 by the operator and various types of information in the autonomous running device 100. An example of the display unit 12 is a display device such as a liquid crystal panel. The display unit 12 may include the touch panel (not illustrated) described above and function as the operation unit 11.

The transmission reception unit 13 has a function of receiving various types of information transmitted from an external apparatus. The transmission reception unit 13 also has a function of transmitting various types of information in the autonomous running device 100 to the external apparatus. The transmission reception unit 13 receives positional information about the destination in the running control processing, which is described later, from the external apparatus, for example. The transmission reception unit 13 transmits route information in running and a current position on the route to the external apparatus. The transmission reception unit 13 may be capable of transmitting a remaining capacity of a battery mounted on the autonomous running device to the external device. The transmission reception unit 13 may be capable of transmitting abnormality occurrence information to the external apparatus. The abnormality occurrence information indicates that reaching the destination becomes impossible when estimation of the self-position becomes impossible or autonomous running becomes impossible due to irregularities on a passageway, for example, in the running control processing, which is described later. An example of the transmission reception unit 13 is a wireless communication device that transmits and receives information by infrared rays or radio waves.

The surrounding information acquisition unit 14 acquires information about surroundings of the autonomous running device 100. The surrounding information acquisition unit 14 may be a visible light camera that acquires two-dimensional images or a laser scanner such as a laser range sensor that acquires three-dimensional distance images, for example.

The surrounding information analysis unit 15 analyzes the information about surroundings of the autonomous running device 100 acquired by the surrounding information acquisition unit 14 and outputs the analyzed surrounding information data to the position estimation unit 102. The surrounding information analysis unit 15 extracts a feature of the surrounding environment from the surrounding information data acquired by the surrounding information acquisition unit 14 and produces the feature of the extracted surrounding environment as the surrounding information data. Examples of the feature of the surrounding environment include a frame of a window on a wall surface, an intersection between sides of the frame, a borderline between the wall surface and a ceiling surface, and intersections between two wall surfaces and the ceiling surface.

Figure 2:
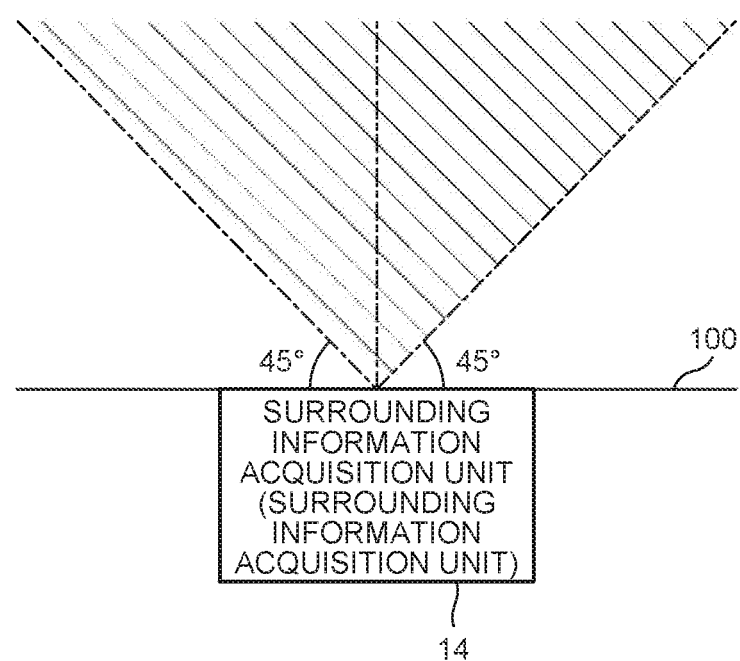
FIG. 2 is a conceptual diagram illustrating an example of an acquisition range of surrounding information data in a surrounding information analysis unit of the autonomous running device according to the first embodiment.

FIG. 2 is a conceptual diagram illustrating an example of the surrounding information data in the surrounding information analysis unit of the autonomous running device according to the first embodiment. FIG. 2 exemplarily illustrates a visible light camera as the surrounding information acquisition unit 14. In the example illustrated in FIG. 2, an acquisition range of the surrounding information data in the surrounding information analysis unit 15 can be set to the range illustrated in FIG. 2 with oblique lines, for example. The range has a substantially conical shape having the vertical direction at the position where the surrounding information acquisition unit 14 is provided as the central axis and a certain elevation angle direction (e.g., 45°) with respect to a movement direction (horizontal direction). This can prevent accuracy reduction of the surrounding information data caused by a moving body (e.g., human body) in the movement direction (horizontal direction) of the autonomous running device 100. The surrounding information data produced by the surrounding information analysis unit 15 does not limit the disclosure. The acquisition range of the surrounding information data in the surrounding information analysis unit 15 illustrated in FIG. 2 is an example. An optimum value of the elevation angle direction with respect to the movement direction (horizontal direction) differs depending on a viewing angle of the visible light camera (surrounding information acquisition unit 14) and a position at which the visible light camera is disposed, for example. The central axis of the acquisition range of the surrounding information data in the surrounding information analysis unit 15 is not limited to the vertical direction. For example, the central axis may be the movement direction (horizontal direction) of the autonomous running device 100. The acquisition range of the surrounding information data in the surrounding information analysis unit 15 is preferably set in a range capable of extracting a feature significant for the information about the surroundings.

The running unit 103 is a moving mechanism that moves the autonomous running device 100. The running unit 103 includes wheels 103a that move the autonomous running device 100 and a driving device (not illustrated) that drives the wheels 103a. The running unit 103 includes a rotation sensor 103b that detects rotation amounts of the wheels 103a. An example of the rotation sensor 103b is a rotation angle sensor that detects rotation angles of the wheels 103a. The running unit 103 may include a gyroscope sensor (not illustrated) as the rotation sensor 103b. The running unit 103 may include an acceleration sensor (not illustrated) as the rotation sensor 103b. The running unit 103 drives the wheels 103a to rotate in accordance with a wheel rotation command value given from the control unit 101 to move the autonomous running device 100.

The control unit 101 is a control unit that achieves autonomous movement control of the autonomous running device 100 according to the first embodiment. The control unit 101 produces a track on which the autonomous running device 100 runs along the route produced by the route generation unit 104, which is described later, and performs real-time computation processing so as to cause the autonomous running device 100 to autonomously move on the track. The control unit 101 is a central processing unit (CPU) that executes a running control program according to the embodiment to achieve the autonomous movement control of the autonomous running device 100, for example.

The control unit 101 performs autonomous movement control on the autonomous running device 100 on the basis of information input via the position estimation unit 102, the route generation unit 104, the storage unit 105, and the input output unit 106. The control unit 101 has a function of storing information input via the input output unit 106 in the storage unit 105. The control unit 101 has a function of outputting information via the input output unit 106.

The position estimation unit 102 includes a first position estimation unit 1021 and a second position estimation unit 1022. The first position estimation unit 1021 estimates the position of the autonomous running device 100 on the basis of the surrounding information data from the surrounding information analysis unit 15 and the information stored in the storage unit 105. The first position estimation unit 1021 produces the information about the estimated position of the autonomous running device 100 as first positional information, updates (overrides) the latest produced first positional information with the produced first positional information, and successively output the update to the control unit 101 and the storage unit 105. The second position estimation unit 1022 estimates the position of the autonomous running device 100 on the basis of rotation amount information from the rotation sensor 103b, which is provided to the wheels 103a of the running unit 103, and the information stored in the storage unit 105. The second position estimation unit 1022 produces the information about the estimated position of the autonomous running device 100 as second positional information, updates (overrides) the latest produced second positional information with the produced second positional information, and successively outputs the update to the control unit 101 and the storage unit 105.

In the embodiment, the first position estimation unit 1021 can determine whether the first positional information is a normal value while the second position estimation unit 1022 can determine whether the second positional information is a normal value. In the embodiment, the control unit 101 can determine whether each of the first positional information output from the first position estimation unit 1021 and the second positional information output from the second position estimation unit 1022 is the normal value. The method for determining whether the first positional information or the second positional information is the normal value does not limit the disclosure.

The first positional information and the second positional information each include coordinates and a posture (orientation) of the autonomous running device 100 on a map shape figure serving as map information about an area where the autonomous running device 100 runs, the coordinates and the posture being stored in the storage unit 105. The map shape figure is described later. The position estimation unit 102 can be achieved by the running control program executed by the CPU, for example.

In the embodiment, the first position estimation unit 1021 collates the surrounding information data from the surrounding information analysis unit 15 with a positional information pattern preliminarily stored in the storage unit 105 to estimate the position of the autonomous running device 100.

This makes it possible to estimate the position of the autonomous running device 100 without providing a specific landmark in an area 200.

Specifically, the first position estimation unit 1021 compares the feature of the surrounding environment included in the surrounding information data with the feature of the surrounding environment in a single or a plurality of positional information patterns, and estimates the position of the autonomous running device 100, thereby producing the first positional information. Depending on an environment of the track on which the autonomous running device 100 runs (e.g., an environment where luminance of an image is excessively high or low, or an environment where a luminance difference is large when the visible light camera is used as the surrounding information acquisition unit 14), the first positional information produced by the first position estimation unit 1021 may become an abnormal value due to estimation accuracy reduction of the self-position.

The second positional information produced by the second position estimation unit 1022 may become an abnormal value due to slipping of the wheels 103a at a level difference, for example.

The second position estimation unit 1022 may estimate the position of the autonomous running device 100 concurrently using an angular velocity from the gyroscope sensor (not illustrated) provided to the running unit 103. The second position estimation unit 1022 may estimate the position of the autonomous running device 100 concurrently using an angular acceleration from an acceleration sensor (not illustrated) provided to the running unit 103. The concurrently use of a plurality of sensors such as the rotation angle sensor, the gyroscope sensor, and the acceleration sensor as the rotation sensor 103b makes it easy to determine whether the second positional information is the normal value.

Specifically, in a case where the position estimated by the rotation angle sensor is used as the second positional information, it may be determined that the second positional information is an abnormal value when the second positional information differs by a certain threshold or more from the estimated position by the gyroscope sensor or the acceleration sensor.

The route generation unit 104 is a constituent unit that produces the route of the autonomous running device 100 in the area where the autonomous running device 100 autonomously runs. The route generation unit 104 outputs the information about the produced route to the storage unit 105 as the route information. An example of route search algorithms used for producing the route information in the route generation unit 104 is an A-star (A*) algorithm. This route search algorithm does not limit the embodiment. The route information is set in accordance with various conditions on the map shape figure. The route on the map shape figure may be the shortest route to the target point or the route according to the various conditions on the map shape figure, for example. The route generation unit 104 can be achieved by the running control program executed by the CPU, for example.

The input output unit 106 has a function of outputting the information input from the operation unit 11 and the transmission reception unit 13 to the control unit 101 and the route generation unit 104, and a function of outputting the information input from the control unit 101 to the display unit 12 and the transmission reception unit 13.

The storage unit 105 stores therein the first positional information output from the first position estimation unit 1021 and the second positional information output from the second position estimation unit 1022 while successively overriding them. The storage unit 105 stores therein the route information output from the route generation unit 104. In the embodiment, the map shape figure is preliminarily stored in the storage unit 105.

The storage unit 105 stores therein various types of information necessary to control the autonomous running device 100, such as various conditions on the map shape figure, in addition to the map shape figure, the first positional information, the second positional information, and the route information. The various conditions on the map shape figure include the positional information about a traffic ban area, and a traffic condition (keep right or keep left) in the area where the autonomous running device 100 runs, for example.

The storage unit 105 includes the positional information patterns for the respective positions on the map shape figure as information used when the first position estimation unit 1021 of the position estimation unit 102 produces the first positional information. In the embodiment, the positional information patterns acquired by the surrounding information acquisition unit 14 with a plurality of viewing points in the area where the autonomous running device 100 runs are preliminarily stored in the storage unit 105.

The map shape figure, the various conditions on the map shape figure, and the multiple positional information patterns may be input by the operator who operates the operation unit 101 and stored in the storage unit 105 by the control unit 101 via the input output unit 106, or may be input from the external apparatus via the transmission reception unit 13 and stored in the storage unit 105 by the control unit 101 via the input output unit 106.

The storage unit 105 stores therein the running control program according to the embodiment. The storage unit 105 is a storage medium such as a hard disk drive or a flash memory, for example. The storage medium storing therein the storage unit 105 may be built in the autonomous running device 100, for example, or may be a portable storage medium such as an optical disc or a universal serial bus (USB) memory. The forms of the storage unit 105 do not limit the embodiment.

Figure 3:
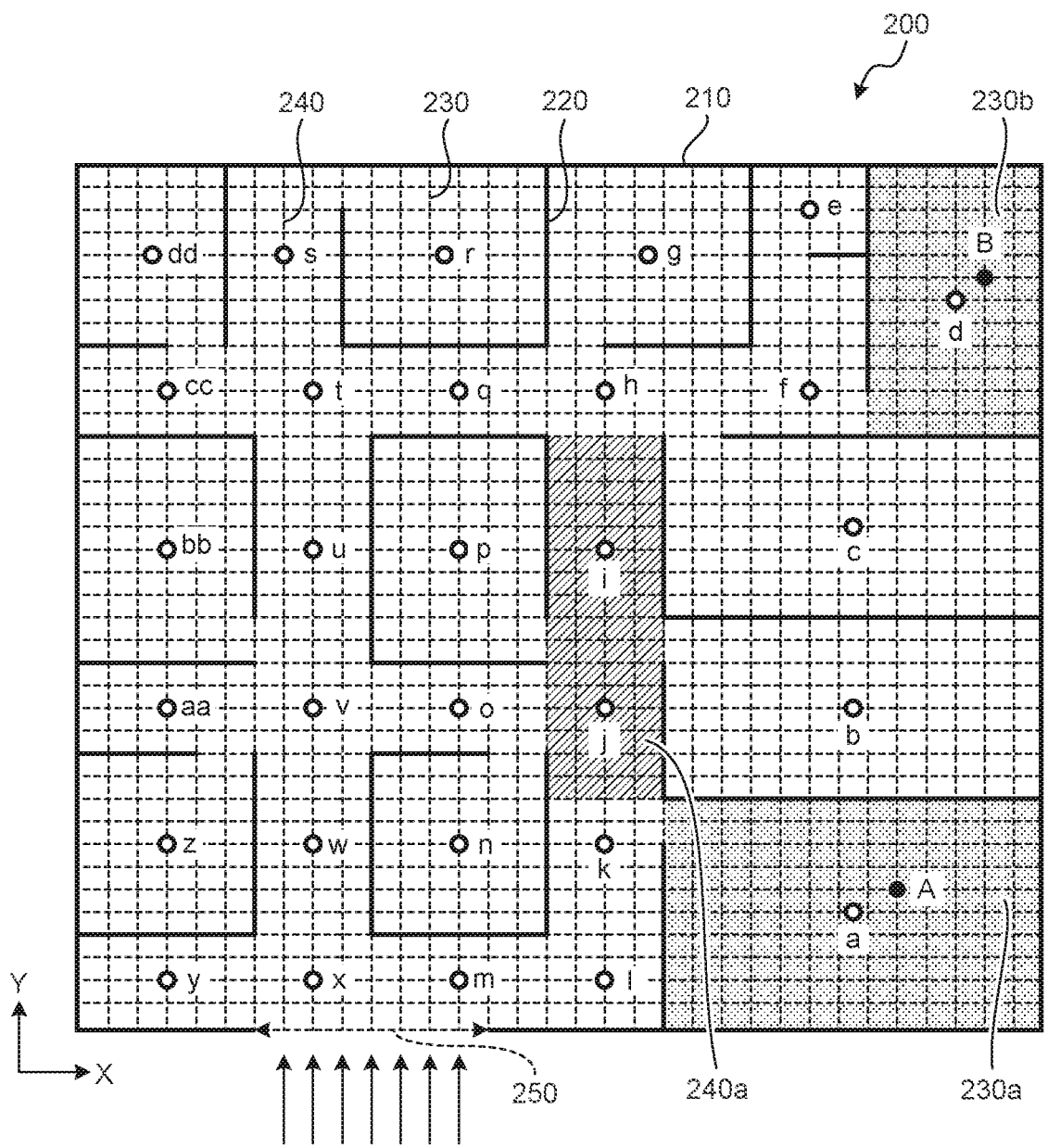
FIG. 3 is a conceptual diagram illustrating an example of a map shape figure of an area where the autonomous running device according to the first embodiment runs.

FIG. 3 is a conceptual diagram illustrating an example of the map shape figure of the area where the autonomous running device according to the first embodiment runs. As illustrated in FIG. 3, the area 200 where the autonomous running device 100 runs is a single floor of a building surrounded by an exterior wall surface 210 in four directions, for example, and is divided into grids in the X and Y directions. In the following description, the position of the autonomous running device 100 is defined by the position in the X and Y directions, each of which is divided into grids in the area 200, and the posture (orientation) of the autonomous running device 100 is defined by an angle θ with respect to the X direction serving as a reference.

In FIG. 3, the area 200 where the autonomous running device 100 runs is partitioned by wall surfaces 220 into a plurality of spaces 230 (e.g., rooms) and a passageway 240 (e.g., corridor) that connects the respective spaces 230. In the example illustrated in FIG. 3, a passageway 240a illustrated with oblique lines is set as a traffic ban area to the autonomous running device 100. In the embodiment, it is specified that the autonomous running device 100 moves on the right side of the passageway 240 as the traffic condition when the autonomous running device 100 moves on the passageway 240.

In the example illustrated in FIG. 3, an opening 250 (e.g., window) is provided on a part of the exterior wall surface.

Direct sun light enters from the direction illustrated with arrows, resulting in the passageway 240, the wall surfaces 220, and the ceiling (not illustrated) near the opening 250 are lighted with direct sun light.

In the example illustrated in FIG. 3, the autonomous running device 100 is disposed at a point A in a space 230a. The operator in a space 230b transmits a command that a point B in the space 230b is the target point to the autonomous running device 100 disposed at the point A in the space 230a. An example of the external apparatus that sends the command is a portable terminal such as a smartphone or a tablet. A plurality of operators may be in the area 200 where the autonomous running device 100 runs. The autonomous running device 100 may be on standby for receiving a command from each of the operator's external apparatuses.

FIG. 3 illustrates an example where the feature of the surrounding environment for each of a plurality of positions a, b, c, . . . , z, aa, bb, cc, and dd is stored in the storage unit 105 as the positional information pattern. In the example illustrated in FIG. 3, the positional information patterns at the respective multiple positions in the respective spaces 230 and on the passageway 240 are stored. The positions at each of which the positional information pattern is stored are not limited to those in the example illustrated in FIG. 3. In the example illustrated in FIG. 3, the positional information pattern at a single position in each space 230 is stored. For alternative example, in a space 230, which is a wide space, the positional information patterns at multiple positions may be stored.

In the embodiment, the running control program stored in the storage unit 105 is executed, resulting in the autonomous movement control of the autonomous running device 100 according to the first embodiment being achieved. The following describes an example where the autonomous running device 100 autonomously runs from the point A in the space 230a to the point B in the space 230b, as illustrated in FIG. 3.

Figure 4:
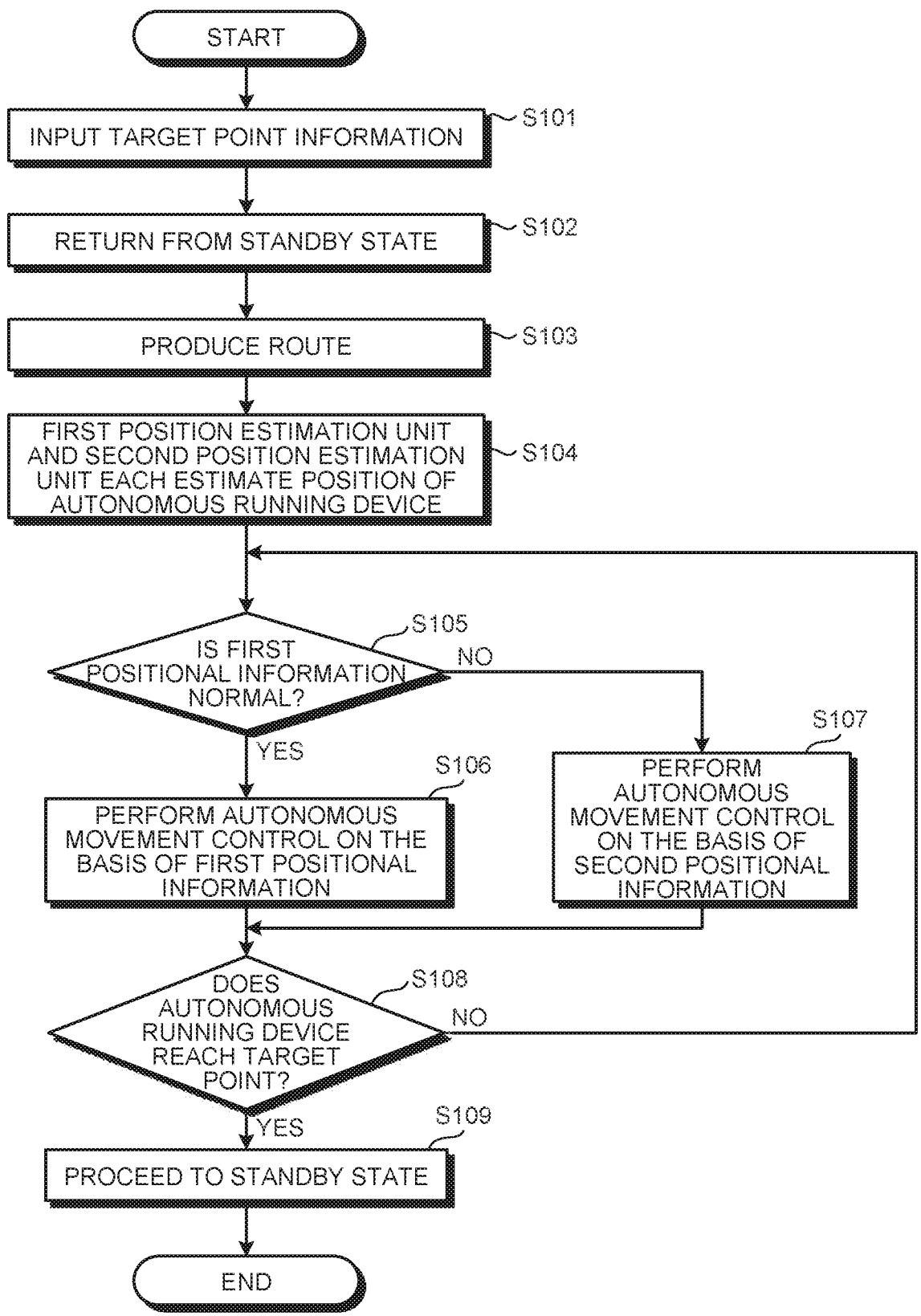
FIG. 4 is a flowchart illustrating an example of running control processing for the autonomous running device according to the first embodiment.

FIG. 4 is a flowchart illustrating an example of the running control processing of the autonomous running device according to the first embodiment.

when the transmission reception unit 13 receives the command that the point B in the space 230b is the target point from the external apparatus, and target point information serving as the positional information about the target point of the autonomous running device 100 on the map shape figure is input (step S101), the autonomous running device 100 returns from a standby state (step S102). The "return from the standby state" means that a state where minimum electric power necessary to receive the command from the external apparatus is supplied proceeds to a state where electric power necessary for the autonomous running device 100 to autonomously run is supplied to respective units in the autonomous running device 100, thereby starting the running control of the autonomous running device 100. In the example illustrated in FIG. 3, (x(b),y(b),θ(b)), which is the position of the point B in the space 230b as well as the target point of the autonomous running device 100, is input as the target point information.

When the autonomous running device 100 returns from the standby state (step S102), the first position estimation unit 1021 estimates an initial position of the autonomous running device 100. In the example illustrated in FIG. 3, the initial position (x(a),y(a),θ(a)) is estimated when the autonomous running device 100 is disposed at the point A in the space 230a. The first position estimation unit 1021 outputs the estimated initial position (x(a),y(a),θ(a)) of the autonomous running device 100 to the control unit 101 and the storage unit 105 as initial positional information. The positional information at the latest running control may be used as the initial positional information about the autonomous running device 100. The operator may operate the operation unit 11 to input the initial positional information about the autonomous running device 100 and the control unit 101 may store the initial positional information in the storage unit 105 via the input output unit 106. The initial positional information about the autonomous running device 100 may be input from the external apparatus via the transmission reception unit 13 and the control unit 101 may store the initial positional information in the storage unit 105 via the input output unit 106.

When the target point information is input, the route generation unit 104 produces the route on the map shape figure from the initial position (the point A (x(a),y(a)) in the space 230a, in this case) of the autonomous running device 100 to the target point (the point B (x(b),y(b)) in the space 230b, in this case) (step S103), and outputs the information about the produced route to the storage unit 105 as the route information.

Figure 5:
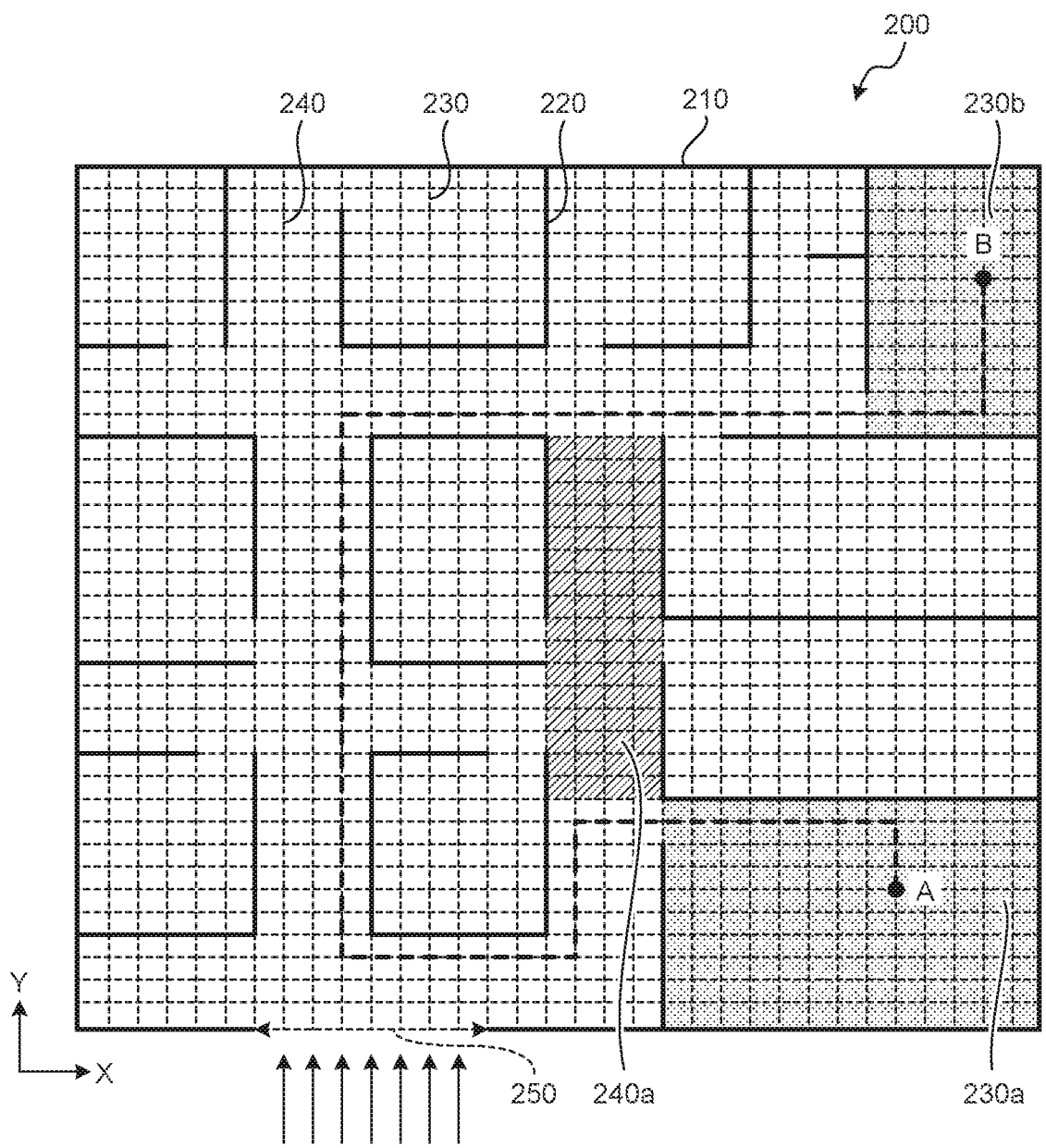
FIG. 5 is a conceptual diagram illustrating an example of a route in the area where the autonomous running device according to the first embodiment runs.

FIG. 5 is a conceptual diagram illustrating an example of the route in the area where the autonomous running device according to the first embodiment runs. FIG. 5 illustrates the route of the autonomous running device 100 with the broken line. FIG. 5 illustrates an example where the point A in the space 230a where the autonomous running device 100 is disposed is the initial position of the autonomous running device 100, the point B in the space 230b where the operator is present is the target point of the autonomous running device 100, and the shortest route to the point B is produced while the passageway 240a, which is the traffic ban area, is bypassed and the autonomous running device 100 moves on the right side of the passageway 240.

The first position estimation unit 1021 and the second position estimation unit 1022 of the position estimation unit 102 each estimate the position of the autonomous running device 100 (step S104), the first position estimation unit 1021 and the second position estimation unit 1022 update the first positional, information and the second positional information, respectively, and successively output them to the control unit 101 and the storage unit 105.

The control unit 101 determines whether the first positional information is the normal value (step S105).

As described above, the passageway 240, the wall surfaces 220, and the ceiling (not illustrated) near the opening 250 are lighted with direct sun light entering from the opening 250. In such a case, near the opening 250, the surrounding information analysis unit 15 cannot extract the feature significant for the surrounding environment from the information about the surroundings acquired by the surrounding information acquisition unit 14 in some cases. In those cases, the estimation accuracy of the self-position by the first position estimation unit 1021 is reduced and the first positional information becomes an abnormal value in some cases.

If the first positional information is the normal value (Yes at step S105), the control unit 101 produces the track along the route illustrated in FIG. 5 on the basis of the first positional information updated by the first position estimation unit 1021, and performs the autonomous movement control such that the autonomous running device 100 runs on the track (step S106).

Figure 6:
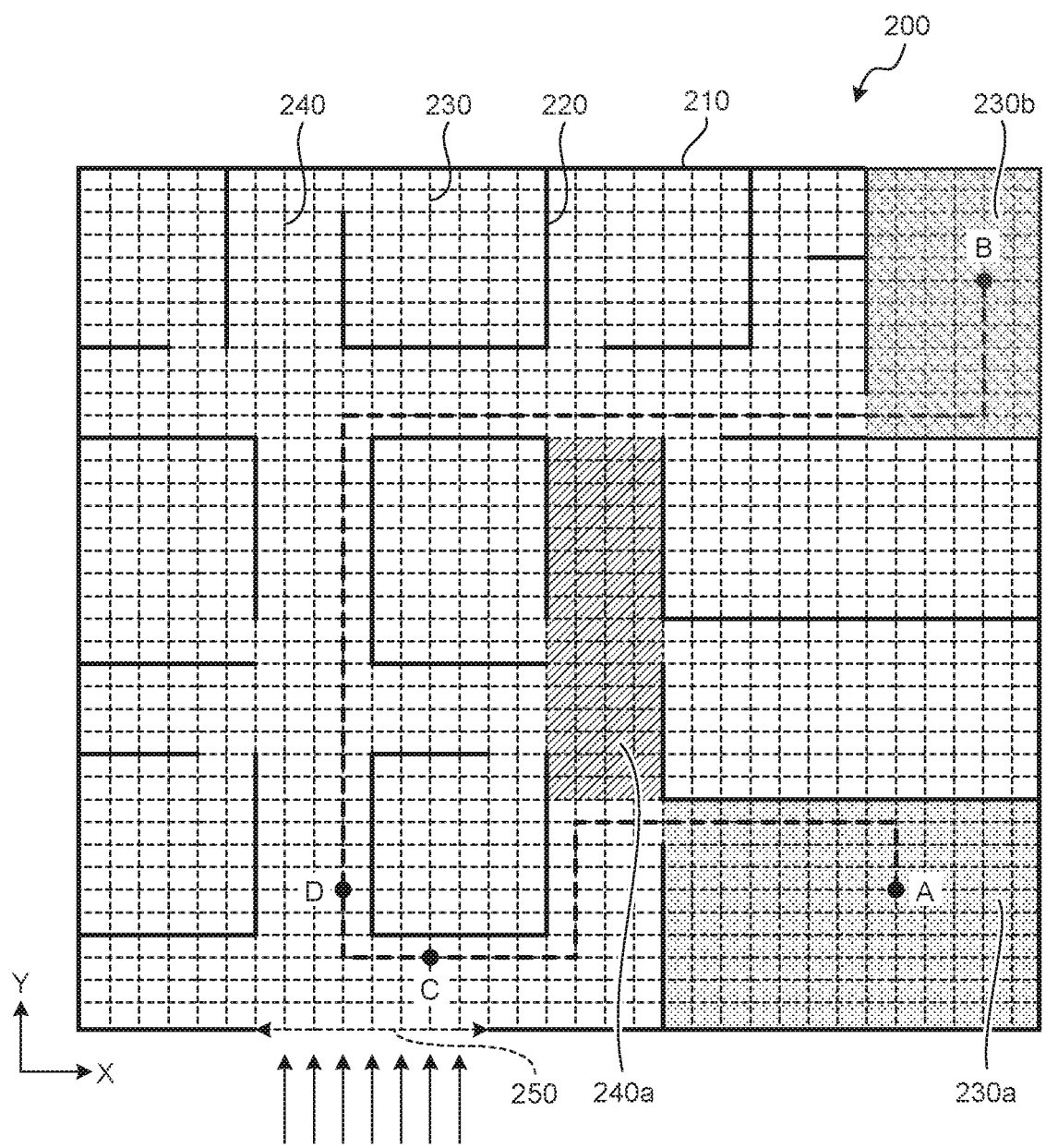
FIG. 6 is a conceptual diagram illustrating an example where a section in which a first position estimation unit does not produce first positional information is present in the route for running the autonomous running device according to the first embodiment.

FIG. 6 is a conceptual diagram illustrating an example where a section in which the first position estimation unit does not produce the first positional information is present in the route for running the autonomous running device according to the first embodiment. FIG. 6 illustrates an example where the first position estimation unit does not update the first positional information in the section from a point C to a point D on the route for running the autonomous running device 100.

If the first positional information becomes an abnormal value at the point C illustrated in FIG. 6 (No at step S105), the control unit 101 performs the autonomous movement control such that the autonomous running device 100 runs on the track along the route illustrated in FIG. 5 on the basis of the second positional information updated by the second position estimation unit 1022.

When the first positional information becomes the normal value at the point D illustrated in FIG. 6, the control unit 101 performs the autonomous movement control described above on the basis of the first positional information updated by the first position estimation unit 1021 (step S107).

The control unit 101 determines whether the autonomous running device 100 reaches the target point (the point B in the space 230b) (step S108). If the autonomous running device 100 does not reach the target point (No at step S108), the processing returns to the processing at step S104, and the processing from step S105 to step S108 is repeated.

If the autonomous running device 100 reaches the target point (Yes at step S108), the control unit 101 ends the autonomous movement control of the autonomous running device 100 and causes the autonomous running device 100 to proceed to the standby state (step S109), and ends the running control processing.

In the embodiment, when the first position estimation unit 1021 cannot produce the first positional information, the autonomous movement control continues on the basis of the second positional information produced by the second position estimation unit 1022, thereby making it possible to reach the target point (the point B in the space 230b).

As described above, the autonomous running device 100 according to the first embodiment includes the first position estimation unit 1021 that estimates the position of the autonomous running device 100 on the basis of the information about the surroundings of the autonomous running device 100 acquired by the surrounding information acquisition unit 14, produces the information about the estimated position of the autonomous running device 100 as the first positional information, and updates the first positional information, the second position estimation unit 1022 that estimates the position of the autonomous running device 100 on the basis of the rotation amounts of the wheels 103a, produces the information about the estimated position of the autonomous running device 100 as the second positional information, and updates the second positional information, and the control unit 101 that performs the autonomous movement control on the autonomous running device 100 on the basis of the first positional information or the second positional information. When the first positional information is an abnormal value, the control unit 101 performs the autonomous movement control on the basis of the second positional information.

The running control method for the autonomous running device 100 according to the embodiment includes a step to produce the route from the position of the autonomous running device 100 in the area 200 to the target point, a step to estimate the position of the autonomous running device 100 on the basis of the information about the surroundings of the autonomous running device 100, to produce the information about the estimated position of the autonomous running device 100 as the first positional information, and to update the first positional information, a step to estimate the position of the autonomous running device 100 on the basis of the rotation amounts of the wheels 103a, to produce the information about the estimated position of the autonomous running device 100 as the second positional information, and to update the second positional information, and a step to perform the autonomous movement control on the autonomous running device 100 on the basis of the first positional information when the first positional information is updated and to perform the autonomous movement control on the basis of the second positional information when the first positional information is an abnormal value.

The running control program of the autonomous running device 100 according to the embodiment causes a computer to perform processing to produce the route from the position of the autonomous running device 100 in the area 200 to the target point, processing to estimate the position of the autonomous running device 100 on the basis of the information about the surroundings of the autonomous running device 100, to produce the information about the estimated position of the autonomous running device 100 as the first positional information, and to update the first positional information, processing to estimate the position of the autonomous running device 100 on the basis of the rotation amounts of the wheels 103a, to produce the information about the estimated position of the autonomous running device 100 as the second positional information, and to update the second positional information, and processing to perform the autonomous movement control on the autonomous running device 100 on the basis of the first positional information when the first positional information is the normal value and to perform the autonomous movement control on the basis of the second positional information when the first positional information is an abnormal value.

The autonomous running device 100, thus, can continue the autonomous movement control on the basis of the second positional information updated by the second position estimation unit 1022 even when the first positional information estimated by the first position estimation unit 1021 is an abnormal value, thereby making it possible to reach the target point.

Second Embodiment

Figure 7:
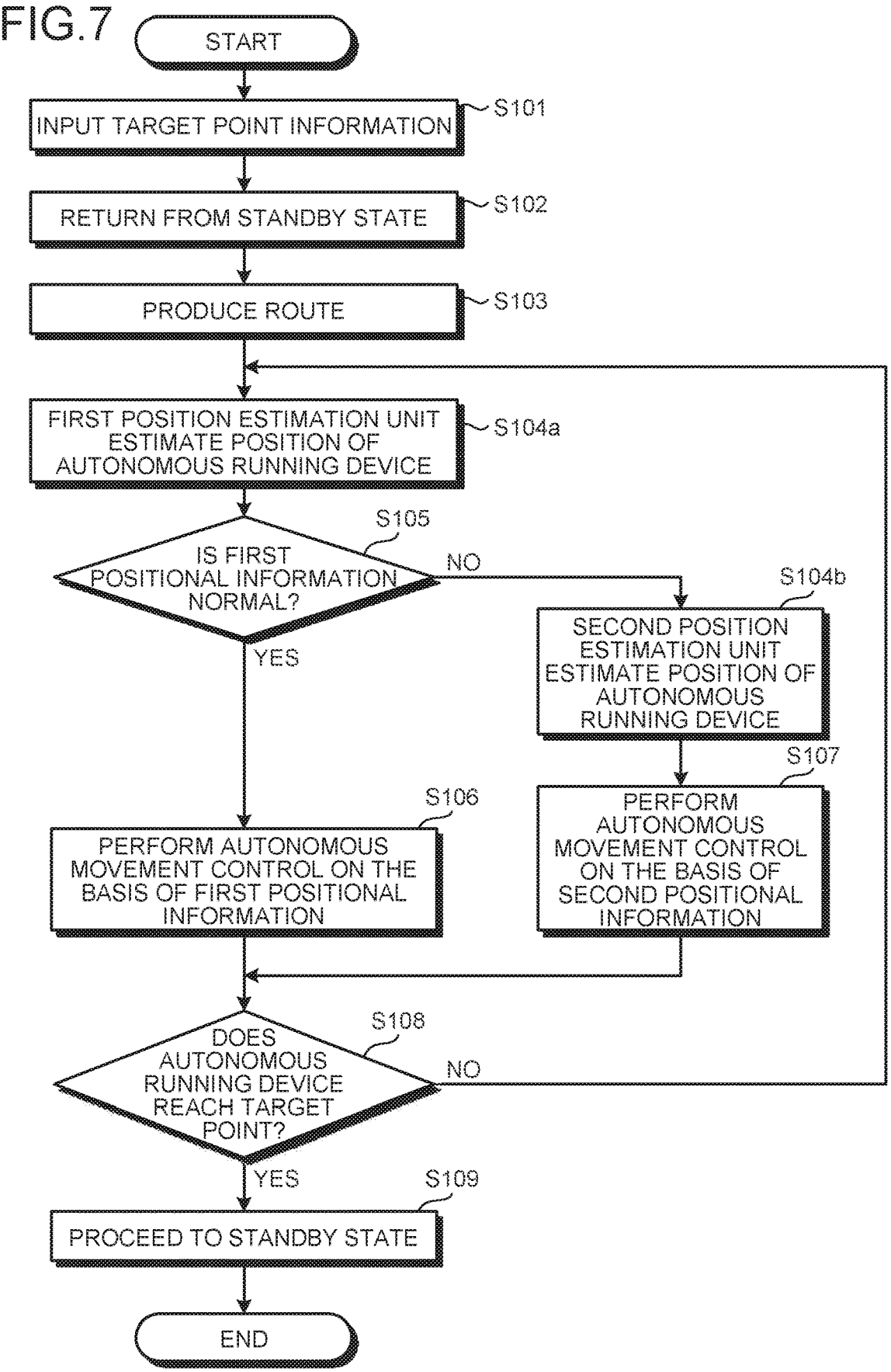
FIG. 7 is a flowchart illustrating an example of running control processing of the autonomous running device according to a second embodiment.
Figure 8:
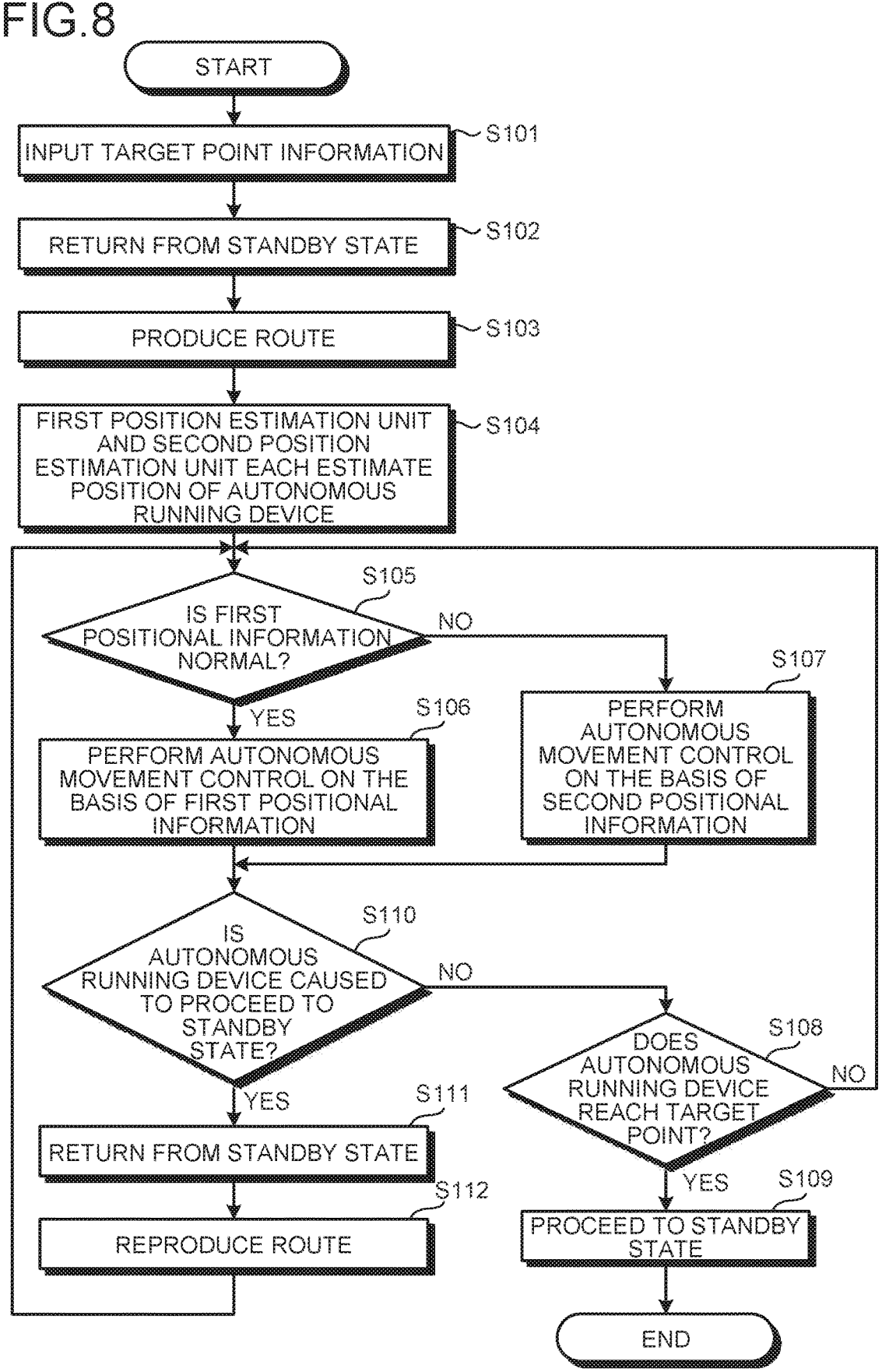
FIG. 8 is a flowchart illustrating an example of running control processing of the autonomous running device according to a third embodiment.

FIG. 7 is a flowchart illustrating an example of running control processing of the autonomous running device according to a second embodiment. The same processing as described in the first embodiment is labeled with the same numeral and duplicated description thereof is omitted. The structure of the autonomous running device according to the second embodiment is the same as that of the first embodiment, and the description thereof is thus omitted.

In the first embodiment, after step S103, at which the route is produced, the first position estimation unit 1021 and the second position estimation unit 1022 of the position estimation unit 102 each estimate the position of the autonomous running device 100 (step S104), and the first position estimation unit 1021 and the second position estimation unit 1022 output the first positional information and the second positional information, respectively, to the control unit 101 and the storage unit 105. In the second embodiment, as illustrated in FIG. 7, after the route is produced (at step S103), the first position estimation unit 1021 estimates the position of the autonomous running device 100 (step S104a), and successively outputs the first positional information to the control unit 101 and the storage unit 105. If the first positional information becomes an abnormal value (No at step S105), the second position estimation unit 1022 estimates the position of the autonomous running device 100 using, as the initial position, the position stored in the storage unit 105 as the first positional information (step S104b), produces the second positional information, and outputs the second positional information to the control unit 101 and the storage unit 105. This makes it possible to continue the autonomous movement control on the basis of the second positional information updated by the second position estimation unit 1022 even when the first positional information becomes an abnormal value.

The second positional information produced by the second position estimation unit 1022 has a possibility of including an error due to slipping of the wheels 103a, for example. In the embodiment, if the first positional information becomes an abnormal value (No at step S105), the second position estimation unit 1022 estimates the position of the autonomous running device 100 using, as the initial position, the position stored in the storage unit 105 as the first positional information. This makes it possible to reduce an error in the position of the autonomous running device 100 estimated by the second position estimation unit 1022.

Third Embodiment

Figure 9:
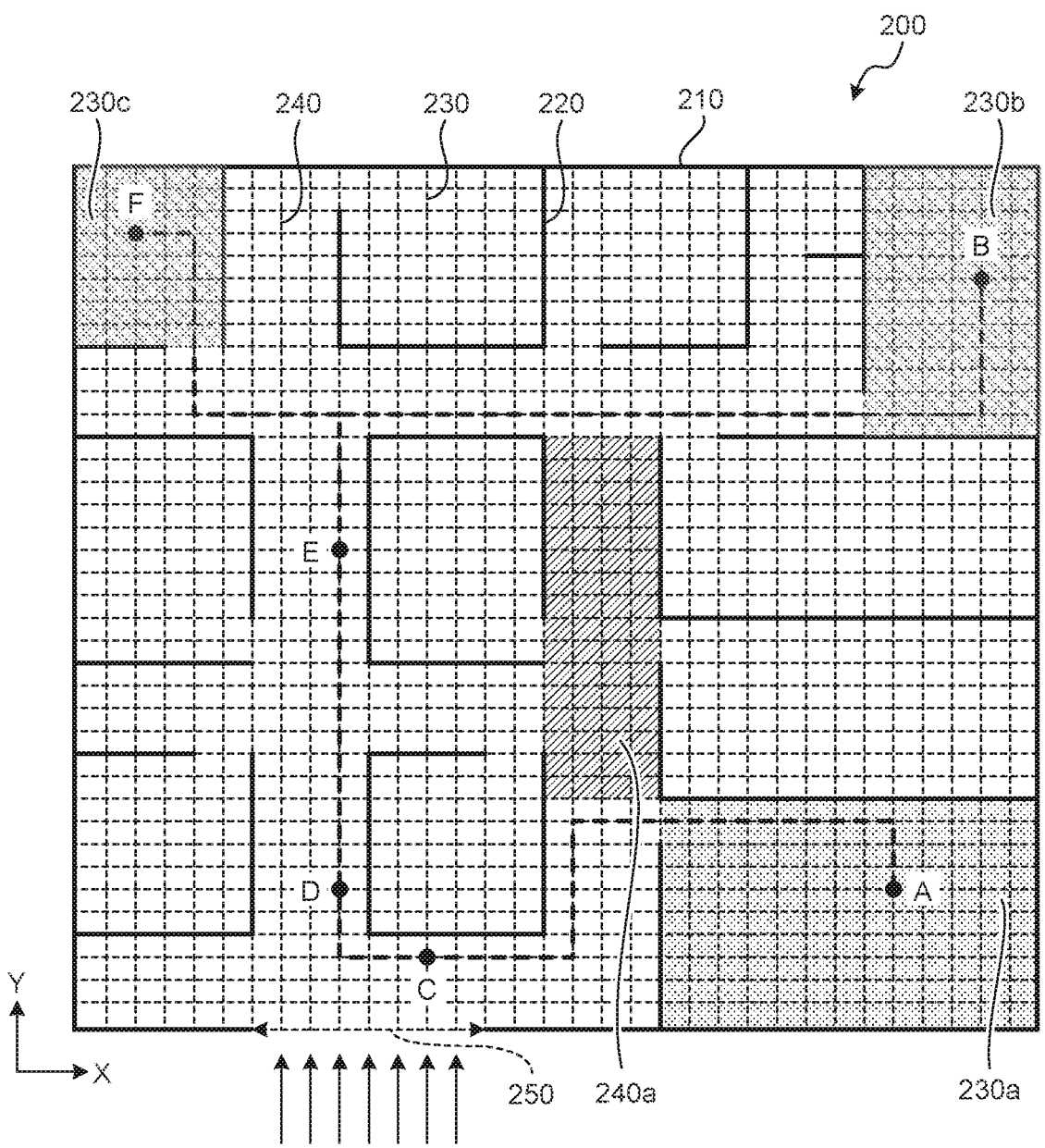
FIG. 9 is a conceptual diagram illustrating an example where the autonomous running device according to the third embodiment is caused to proceed to a standby state and caused to be deviated from the route for running the autonomous running device.

FIG. 6 is a flowchart illustrating an example of running control processing of the autonomous running device according to a third embodiment. FIG. 9 is a conceptual diagram illustrating an example where the autonomous running device according to the third embodiment is caused to proceed to the standby state and caused to be deviated from the route for running the autonomous running device. The same processing as described in the first embodiment is labeled with the same numeral and duplicated description thereof is omitted. The structure of the autonomous running device according to the third embodiment is the same as that of the first embodiment, and the description thereof is thus omitted.

FIG. 9 illustrates an example where the operator operates the operation unit 11 to forcibly cause the autonomous running device 100 to proceed to the standby state at a point E on the route for running the autonomous running device 100 and manually moves the autonomous running device 100 to a point F in a space 230c.

In the embodiment, the control unit 101 determines whether the autonomous running device 100 is caused by the operator to proceed to the standby state (step S110) when the autonomous running device 100 runs on the route under the autonomous movement control at step S106 or step S107.

If the autonomous running device 100 is not caused to proceed to the standby state (No at step S110), the processing proceeds to the processing at step S108.

When the autonomous running device 100 returns from the standby state (at step S111) at the point F in the space 230c after the autonomous running device 100 is caused to proceed to the standby state (Yes at step S110), the first position estimation unit 1021 estimates the current position of the autonomous running device 100. In the example illustrated in FIG. 9, the first position estimation unit 1021 estimates the current position $(x(f),y(f),\theta(f))$, when the autonomous running device 100 is disposed at the point F in the space 230c. The first position estimation unit 1021 outputs the estimated current position $(x(f),y(f),\theta(f))$ of the autonomous running device 100 to the control unit 101 and the storage unit 105 as the current positional information. At step S111, which is the return from the standby state, the operator may operate the operation unit 11 to cause the autonomous running device 100 to return from the standby state. Alternatively, the autonomous running device 100 may return from the standby state after a certain time from step S110 at which the autonomous running device 100 is caused to proceed to the standby state.

The route generation unit 104 reproduces the route on the map shape figure from the current position (the point F $(x(f),y(f)$ in the space 230c) of the autonomous running device 100 to the target point (the point B $(x(b),y(b)$ in the space 230b) (step 3112), outputs the information about the reproduced route to the storage unit 105 as the route information. The processing, then, returns to the processing at step S105.

Even when the autonomous running device 100 is caused by the operator to proceed to the standby state when the autonomous running device 100 runs on the route under the autonomous movement control at step 3106 or step S107, and the operator causes the autonomous running device 100 to be deviated from the route produced by the route generation unit 104 at step 3103, the route generation unit 104 in the embodiment resets the route for the target point at the time when the autonomous running device 100 returns from the standby state, thereby making it possible to reach the target point.

Fourth Embodiment

Figure 10:
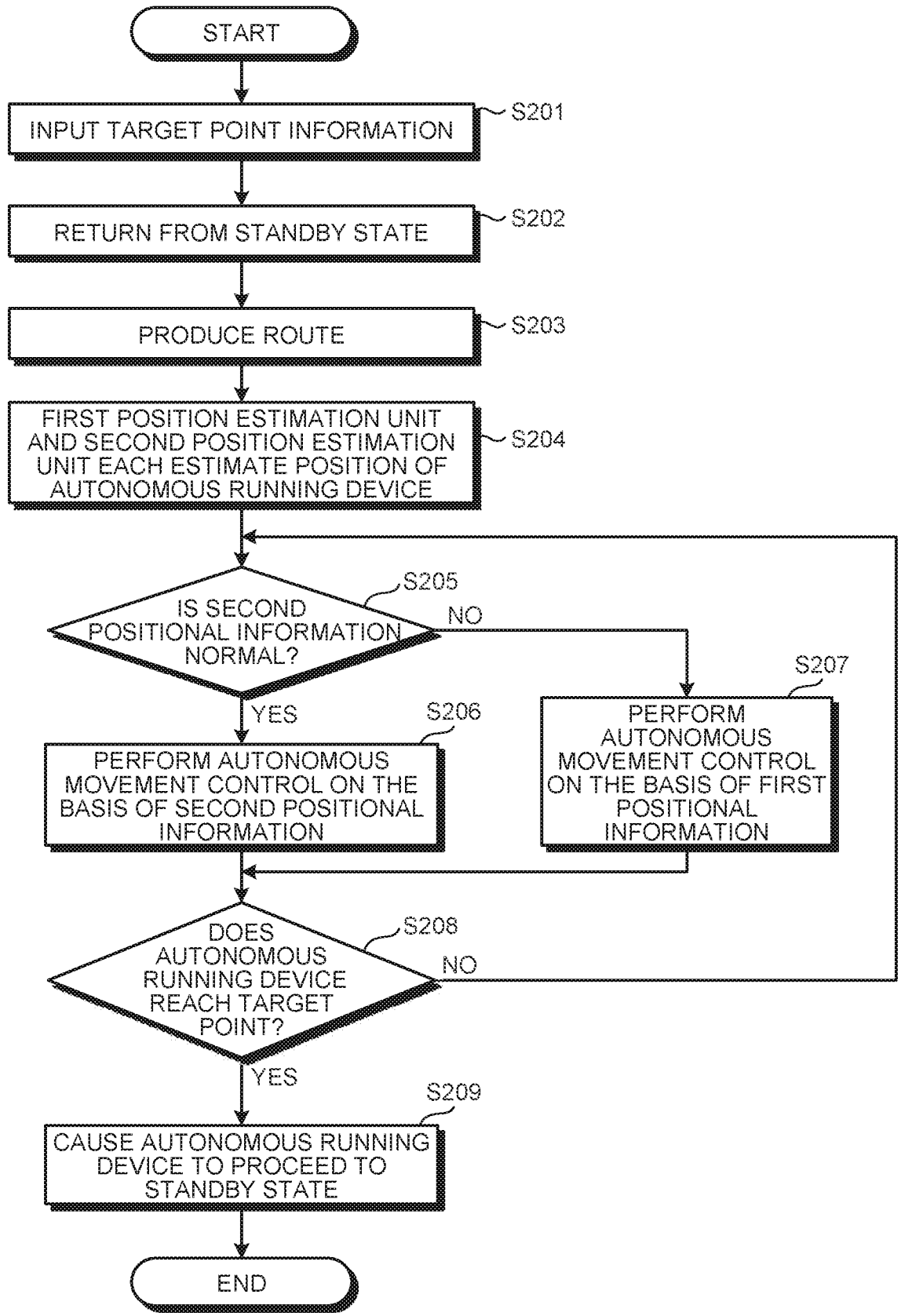
FIG. 10 is a flowchart illustrating an example of running control processing of the autonomous running device according to a fourth embodiment.

FIG. 10 is a flowchart illustrating an example of running control processing of the autonomous running device according to a fourth embodiment. The structure of the autonomous running device according to the fourth embodiment, the map shape figure of the area where the autonomous running device runs, and the route in the area where the autonomous running device runs are the same as those described in the first embodiment. The descriptions thereof are, thus, omitted.

when the transmission reception unit 13 receives the command that the point B in the space 230b is the target point from the external apparatus, and the target point information serving as the positional information about the target point of the autonomous running device 100 on the map shape figure is input (step S201), the autonomous running device 100 returns from the standby state (step S202).

In the embodiment, the first position estimation unit 1021 may estimate the initial position of the autonomous running device 100 after the autonomous running device 100 returns from the standby state (step S202) and output the estimated initial position of the autonomous running device 100 to the control unit 101 and the storage unit 105 as the initial positional information, or the positional information in the latest running control may be used as the initial positional information about the autonomous running device 100. The operator may operate the operation unit 11 to input the initial positional information about the autonomous running device 100 and the control unit 101 may store the initial positional information in the storage unit 105 via the input output unit 106. The initial positional information about the autonomous running device 100 may be input from the external apparatus via the transmission reception unit 13 and the control unit 101 may store the initial positional information in the storage unit 105 via the input output unit 106.

When the target point information is input, the route generation unit 104 produces the route on the map shape figure from the initial position of the autonomous running device 100 to the target point (step S203), and outputs the information about the produced route to the storage unit 105 as the route information.

The first position estimation unit 1021 and the second position estimation unit 1022 of the position estimation unit 102 each estimate the position of the autonomous running device 100 (step S204), the first position estimation unit 1021 and the second position estimation unit 1022 update the first positional information and the second positional information, respectively, and successively output them to the control unit 101 and the storage unit 105.

The control unit 101 determines whether the second positional information is normal (step S205).

When a level difference is present between the passageway 240 and the respective spaces 230 on the route of the autonomous running device 100, for example, as described above, the wheels 103a slip at the level difference, resulting in the second positional information becoming an abnormal value in some cases.

If the second positional information is the normal value (Yes at step S205), the control unit 101 produces the track on the basis of the second positional information updated by the second position estimation unit 1022 and performs the autonomous movement control such that the autonomous running device 100 runs on the track (step S206).

If the second positional information becomes an abnormal value (No at step S205), the control unit 101 performs the autonomous movement control such that the autonomous running device 100 runs on the basis of the first positional information updated by the first position estimation unit 1021.

If the second positional information becomes the normal value, the control unit 101 performs the autonomous movement control on the basis of the second positional information updated by the second position estimation unit 1022 (step S207).

The control unit 101 determines whether the autonomous running device 100 reaches the target point (step S208). If the autonomous running device 100 does not reach the target point (No at step S208), the processing returns to the processing at step S204, and the processing from step S205 to step S208 is repeated.

If the autonomous running device 100 reaches the target point (Yes at step S208), the control unit 101 ends the autonomous movement control of the autonomous running device 100 and causes the autonomous running device 100 to proceed to the standby state (step S209), and ends the running control processing.

In the embodiment, when the second positional information estimated by the second position estimation unit 1022 is an abnormal value, the autonomous movement control continues on the basis of the first positional information updated by the first position estimation unit 1021, thereby making it possible to achieve the target point.

REFERENCE SIGNS LIST

11 operation unit
12 display unit
13 transmission reception unit
14 surrounding information acquisition unit
15 surrounding information analysis unit
100 autonomous running device
101 control unit
102 position estimation unit
103 running unit
103a wheel
103b rotation sensor
104 route generation unit
105 storage unit
106 input output unit
200 area
210 exterior wall surface
220 wall surface
230, 230a, 230b, 230c space (room)
240, 240a passageway (corridor)
250 opening (window)
1021 first position estimation unit
1022 second position estimation unit

The invention claimed is:

1. An autonomous running device that autonomously runs in a certain area, the autonomous running device comprising:
   a camera that acquires information about surroundings of the autonomous running device;
   a runner that moves the autonomous running device, the runner including a driving device that drives wheels;
   a rotation sensor that detects rotation amounts of the wheels provided to the runner;
   a storage storing information necessary to control the autonomous running device;
   a route generating circuit that produces a route of the autonomous running device;
   a first position estimating circuit that estimates a position of the autonomous running device on the basis of the information about the surroundings of the autonomous running device, produces information about the estimated position of the autonomous running device as first positional information, and overrides the first positional information stored in the storage with the produced first positional information;
   a second position estimating circuit that estimates a position of the autonomous running device using, as an initial position, the first positional information stored in the storage, on the basis of the rotation amounts, when the first positional information is not produced, and produces information about the estimated position of the autonomous running device as second positional information;
   a controller that produces a track of the autonomous running device along the route, performs real time computing processing such that the autonomous running device autonomously moves on the track, and performs autonomous movement control on the autonomous running device on the basis of the second positional information.

2. The autonomous running device according to claim 1, further comprising:
   a surrounding information analyzing circuit that analyzes the information about the surroundings of the autonomous running device as surrounding information data and outputs the surrounding information data to the first position estimating circuit; wherein
   the storage stores therein, as a positional information pattern, at least a feature of a surrounding environment for each of a plurality of positions in the certain area, wherein
   the first position estimating circuit collates the surrounding information data with the positional information pattern and estimates the position of the autonomous running device.

3. The autonomous running device according to claim 2, wherein the surrounding information analyzing circuit sets a range including a certain elevation angle direction with respect to a movement direction of the autonomous running device as an acquisition range of the surrounding information data.

4. The autonomous running device according to claim 1, wherein the route generating circuit produces the route from the position of the autonomous running device in the certain area to a target point.

5. The autonomous running device according to claim 4, wherein, when target point information serving as positional information about the target point is received from an external apparatus, the route generating circuit uses the position of the autonomous running device estimated by the first position estimating circuit as an initial position, and produces the route from the initial position to the target point.

6. The autonomous running device according to claim 4, wherein, when the autonomous running device is deviated from the route, the route generating circuit uses the position of the autonomous running device estimated by the first position estimating circuit as a current position, and reproduces the route from the current position to the target point.

7. A running control method for an autonomous running device that autonomously runs in a certain area, the running control method comprising:
   a step of producing a route from a position of the autonomous running device in the certain area to a target point;
   a step of estimating a position of the autonomous running device on the basis of information about surroundings of the autonomous running device, producing information about the estimated position of the autonomous running device as first positional information, and overriding the first positional information stored in a storage with the produced first positional information;
   a step of estimating a position of the autonomous running device using, as an initial position, the first positional information stored in the storage, on the basis of rotation amounts of wheels provided to a runner that moves the autonomous running device, when the first positional information is not produced, and producing information about the estimated position of the autonomous running device as second positional information; and
   a step of producing a track of the autonomous running device along the route, performing real time computing processing such that the autonomous running device autonomously moves on the track, and performing the autonomous movement control on the basis of the second positional information.

8. A non-transitory computer readable recording medium storing therein a running control program of an autonomous running device that autonomously runs in a certain area, the running control program causing a computer to execute processing for:
   producing a route from a position of the autonomous running device in the certain area to a target point;
   estimating a position of the autonomous running device on the basis of information about surroundings of the autonomous running device, producing information about the estimated position of the autonomous running device as first positional information, and overriding the first positional information stored in the storage with the produced first positional information;
   estimating a position of the autonomous running device using, as an initial position, the first positional information stored in the storage, on the basis of rotation amounts of wheels provided to a runner that moves the autonomous running device, when the first positional information is not produced, and producing information about the estimated position of the autonomous running device as second positional information; and
   producing a track of the autonomous running device along the route, performing real time computing processing such that the autonomous running device autonomously moves on the track, and performing the autonomous movement control on the basis of the second positional information.

* * * * *